United States Patent
Potter et al.

(10) Patent No.: US 10,394,690 B1
(45) Date of Patent: Aug. 27, 2019

(54) SERIALIZE VIEW MODEL FOR DEBUGGING AND APPLICATION SUPPORT

(71) Applicant: Square, Inc., San Francisco, CA (US)

(72) Inventors: Zachary Potter, San Francisco, CA (US); Kathryne Hawthorne, San Francisco, CA (US); Victor Tsou, Oakland, CA (US)

(73) Assignee: Square, Inc., San Francisco, CA (US)

( * ) Notice: Subject to any disclaimer, the term of this patent is extended or adjusted under 35 U.S.C. 154(b) by 70 days.

(21) Appl. No.: 14/983,842

(22) Filed: Dec. 30, 2015

(51) Int. Cl.
 G06F 8/70 (2018.01)
 G06F 11/07 (2006.01)
 G06F 11/14 (2006.01)
 G06F 11/36 (2006.01)

(52) U.S. Cl.
 CPC ............ *G06F 11/3636* (2013.01); *G06F 8/70* (2013.01); *G06F 11/0775* (2013.01); *G06F 11/0778* (2013.01); *G06F 11/1471* (2013.01)

(58) Field of Classification Search
 CPC ... G06F 11/1446–1469; G06F 11/1471; G06F 11/3636; G06F 11/3644; G06F 11/3466; G06F 11/3476; G06F 11/0766–0787; G06F 8/70
 See application file for complete search history.

(56) References Cited

U.S. PATENT DOCUMENTS

| | | | | |
|---|---|---|---|---|
| 8,996,930 B2* | 3/2015 | Waugh | ............... | G06F 11/0778 714/25 |
| 9,122,803 B1* | 9/2015 | Michelsen | .......... | G06F 11/3466 |
| 9,170,922 B1* | 10/2015 | Lachwani | .......... | G06F 11/3664 |
| 9,213,622 B1* | 12/2015 | Morgan | ............... | G06F 11/3636 |
| 2002/0087949 A1* | 7/2002 | Golender | ............... | G06F 9/547 717/124 |
| 2007/0277061 A1* | 11/2007 | Ashe | ...................... | G06F 11/079 714/57 |
| 2012/0102373 A1* | 4/2012 | Waugh | ............... | G06F 11/0769 714/57 |

OTHER PUBLICATIONS

Apple. "View Programming Guide for iOS: About Windows and Views." Sep. 17, 2014. Retrieved by the Examiner from https://developer.apple.com/library/archive/documentation/WindowsViews/Conceptual/ViewPG_iPhoneOS/Introduction/Introduction.html on Sep. 14, 2018. (Year: 2014).*

* cited by examiner

*Primary Examiner* — Emerson C Puente
*Assistant Examiner* — Erika Kretzmer
(74) *Attorney, Agent, or Firm* — Lee & Hayes, P.C.

(57) ABSTRACT

Techniques for generating serialized view models that are used for both debugging an application and application support. The techniques include executing an application, creating a view model associated with the application, the view model including information associated with a service provided by the application, and presenting a user interface associated with the view model. The techniques can further include identifying, while presenting the user interface, an error occurring with the application, capturing a stack trace corresponding to the error, capturing a process image of the view model, serializing the process image of the view model to generate a serialized view model, and sending the stack trace and the serialized view model to a service. The service can then use the stack trace and the serialized view model to debug the application.

19 Claims, 8 Drawing Sheets

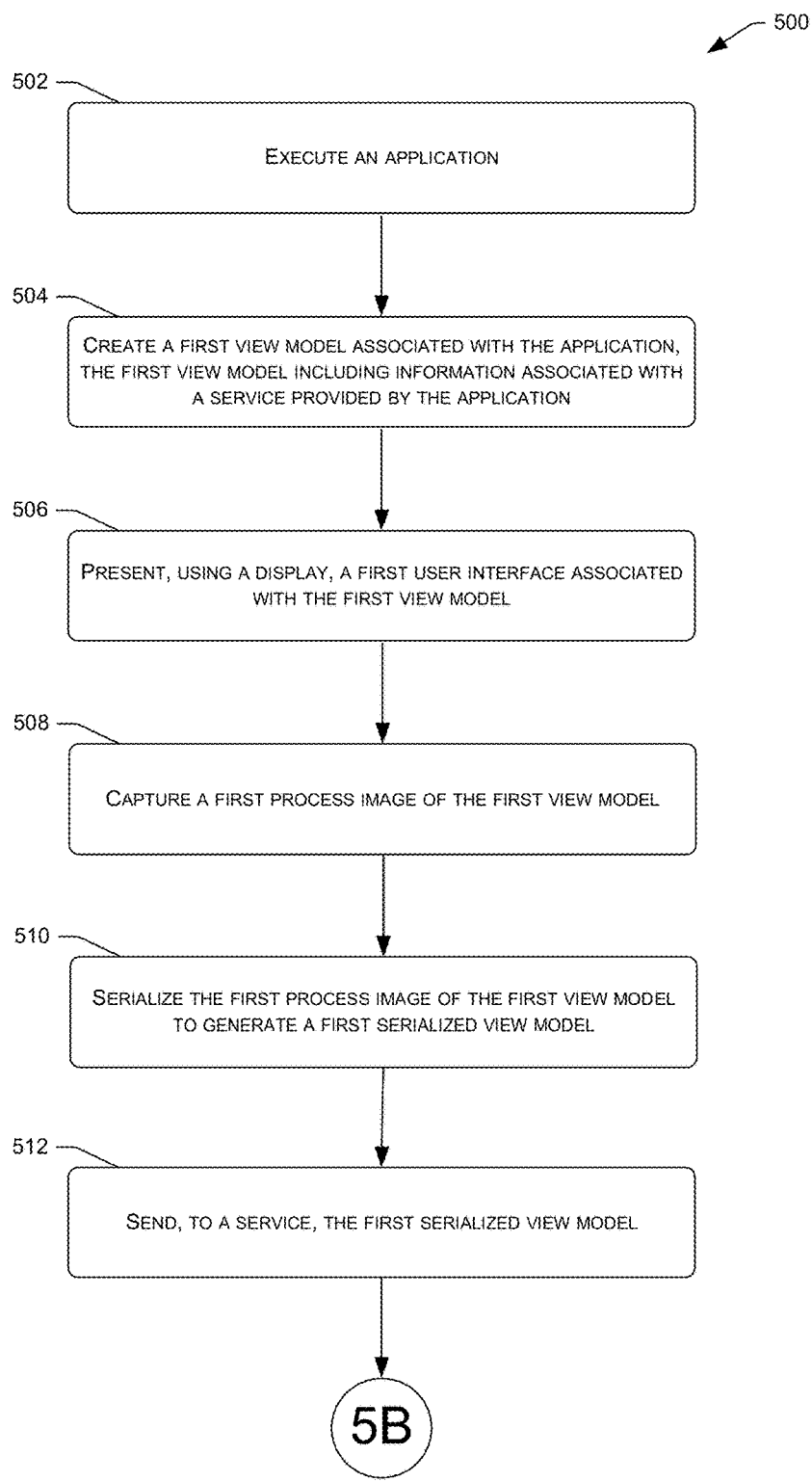

SERIALIZE VIEW MODEL FOR DEBUGGING AND APPLICATION SUPPORT

BACKGROUND

Developers create various software applications to perform different activities for users. For instance, software applications can help users plan a trip, shop, play games, read the news, or the like. When creating a software application, a developer must write code that is executed by a processor in order for the software application to operate correctly. However, writing code for a software application can be very complex. As such, a developer may make a mistake in writing the code, which can cause bugs or defects that prevent the correct operation of the software application. For instance, the bugs or defects can cause the software application to crash.

When a software application crashes, the developer can debug the software application in order to find and resolve the bugs or defects that prevented the correct operation of the software application. Debugging can range from fixing simple errors with the software application, to performing tasks of data collection, analysis, and scheduling updates for the software application. As such, tools that provide the developer with information about the crash can be crucial for the developer when debugging the software application.

Even well-developed applications can, during regular use, encounter unexpected error conditions that confuse or frustrate users. Without crashing or otherwise suffering from a programming bug, an application can still present an error condition to a user. For instance, the application may be unable to communicate with an input and/or output device of an electronic device. For example, an application may be unable to communicate with a printer when the user tries to print a document using the application. For another example, an application may be unable to communicate with a network interface in order to download updates for the application. When an unexpected error conduction occurs with the application, the application may display an error message corresponding to the error condition. A customer support agent can then use the error message to fix the unexpected error condition of the application.

BRIEF DESCRIPTION OF THE DRAWINGS

The detailed description is set forth with reference to the accompanying figures, in which the left-most digit of a reference number identifies the figure in which the reference number first appears. The use of the same reference numbers in the same or different figures indicates similar or identical items or features.

FIGS. 5A-5C illustrate a flow diagram of an example process for providing a serialized view model each time a service updates.

DETAILED DESCRIPTION

Figure 1:
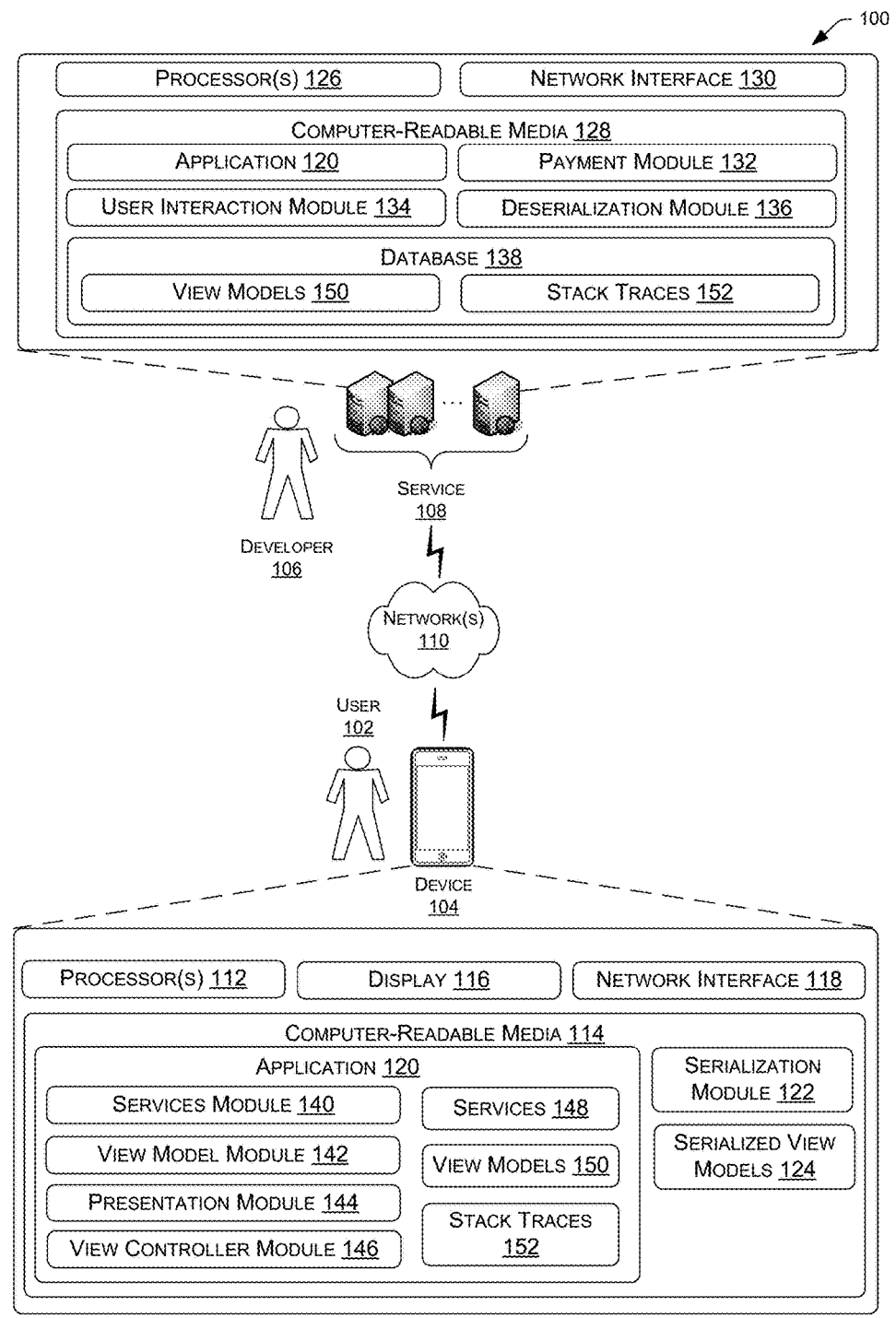
FIG. 1 illustrates an example environment for providing serialized view models that are used for debugging and application support.

This disclosure describes systems and processes for providing one or more serialized view models that are used to debug an application or help provide support for an application. In some examples, a developer can create an application to perform different activities. For instance, the application can include a shopping application, traveling application, videogame application, social networking application, or the like. A user can then download and execute the application on a user device. For instance, the application may cause a display of the user device to present a user interface. The user can then interact with functionality of the application using features of the user interface.

When executing the application on the user device, an error may occur with the application. For instance, the application may include one or more bugs and/or defects that prevent the correct operation of the application. The one or more bugs or defects can cause the application to crash while the user device is executing the application. In some examples, when the application crashes, the application may freeze. Additionally or alternatively, in some examples, the crash may cause the user device to exit (e.g., close or shutdown) the application.

In some examples, in response to the error, the application can capture a stack trace corresponding to the error. The stack trace can include a report of active stack frames that are executing during a time of the error. Additionally or alternatively, in some examples, the application may further capture a process image of a view model. The view model can include an abstract or concrete data structure that holds information the application uses to display the user interface to the user (e.g., an entirety of the information or a portion of the information) and provide the functionality of the application. As such, the process image of the view model can include a state of the view model at a time of the error.

In some examples, after capturing the process image of the view model, the user device and/or application can serialize the process image of the view model. Serializing the process image of the view model can include translating the process image of the view model into a data format that the user device can store and/or transmit over a network. For instance, the user device and/or the application can serialize the process image of the view model in order to generate a serialized view model. The serialized view model can include the data format that the user device can transmit via a network.

In some examples, the application can then cause the user device to send the stack trace and/or the serialized view model to a service. The service can be associated with a developer of the application and/or an additional entity (e.g., electronic device or other user) that can debug the application. In some examples, the service can deserialize the serialized view model in order to regenerate a/the process image of the view model. The service can then provide the stack trace and/or the view model to the developer (and/or an additional entity) so that the developer can debug the application. For instance, the developer can use the stack trace and/or the view model to find and resolve bugs or defects that caused the error with the application. In some examples, after debugging the application, the service can send an update for the application to the user device in order to fix the application on the user device.

Advantages may include at least: (1) reducing application crashes on electronic devices; (2) increasing performance when debugging the application; (3) increasing operation of the application after the debugging; and (4) reducing network usage. For instance, the techniques described above can reduce application crashes on electronic devices since a developer can use both the stack trace and the serialized view model to correct more errors with the application while debugging the application. This also causes the application to operate better since there will be less errors with the application each time the developer debugs and updates the application on the electronic devices. Additionally, network resources are reduced as less crash reports are required because of the increase of the operation of the application.

Additional details and scenarios are described below. This brief introduction is provided for the reader's convenience and is not intended to limit the scope of the claims. Furthermore, the techniques described above and below may be implemented in a number of ways and in a number of contexts. Several example implementations and contexts are provided with reference to the following figures, as described below in more detail. However, the following implementations and contexts are but a few of many. For example, though discussed herein in the context of a payment handling system, implementations are not so limited.

FIG. 1 illustrates an example environment for providing serialized view models that are used to debug a mobile application. As shown in FIG. 1, the environment 100 may include one or more user(s) 102, one or more user device(s) 104 associated with the user(s) 102, one or more developer (s) 106, one or more service devices 108 associated with the one or more developer(s) 106, and one or more network(s) 110. In some examples, the user 102 may operate the user device(s) 104, which may include one or more processor(s) 112, computer-readable media 114, a display 116, and a network interface 118. The computer-readable media 114 may store an application 120, a serialization module 122, and serialized view models 124. Similarly, developer 106 may operate service device(s) 108, which may include one or more processor(s) 126, computer-readable media 128, and a network interface 130. The computer-readable media 128 may store the application 120, a payment module 132, a user interaction module 134, a deserialization module 136, and a database 138.

In some examples, the user 102 may operate a user device 104 to perform various functions associated with the user device 104. The user device 104 may include a point-of-sale (POS) device, a personal computer, a laptop computer, a cellular telephone, a PDA, a tablet device, or any other device. The user device 104 shown in FIG. 1 is only one example of a user device 104 and is not intended to suggest any limitation as to the scope of use or functionality of any user device 104 utilized to perform the processes and/or procedures described herein. For example, the user device 104 may include various other applications or modules.

The processor(s) 112 of the user device 104 may execute one or more modules and/or processes (such as the application 120) to cause the user device 104 to perform a variety of functions, as set forth above and explained in further detail in the following disclosure. In some implementations, the processor(s) 112 may include a central processing unit (CPU), a graphics processing unit (GPU), both CPU and GPU, or other processing units or components known in the art. Additionally, each of the processor(s) 112 may possess its own local memory, which also may store program modules, program data, and/or one or more operating systems.

Depending on the exact configuration and type of the user device 104, the computer-readable media 114 (discussed in more detail below) may include volatile memory (such as RAM), non-volatile memory (such as ROM, flash memory, miniature hard drive, memory card, or the like), or some combination thereof.

In some examples, the user device 104 may also include input device(s) such as a keyboard, a mouse, a pen, a voice input device, a touch input device, etc. The user device 104 may also include the display 116 and other output device(s), such as speakers, a printer, etc. The user 102 may utilize the foregoing features to interact with the user device 104, or the service device(s) 108 via the network(s) 110. More particularly, the display 116 of the user device 104 may include any type of display 116 known in the art that is configured to present (e.g., display) information to the users 102.

In some examples, the user 102 may use user device 104 to execute application 120. In some examples, the application 120 can include a shopping application (e.g., for purchasing items, managing purchased items, tracking shipping, etc.), traveling application (e.g., for booking travel including flights, hotels, activities, etc.), videogame application (e.g., sports games, board games, action games, racing games, etc.), social networking application, or the like. As illustrated in FIG. 1, the application 120 includes a service module 140, a view model module 142, a presentation module 144, and a view controller module 146. The application further includes service 148, view models 150, and stack traces 152.

The processor(s) 112 of the user device 104 can execute the services module 140 in order to generate and update the services 148 of the application 120. The services 148 can include a class of code that performs the hidden logic of the application 120. In some examples, the application 120 can include different services 148 that perform various functions of the application 120. For instance, if the application 120 includes an online shopping application, the services 148 can include a cart service for searching for and selecting items for purchase, a payment service for conducting a transaction to purchase the one or more selected items, and a refund service for returning previously purchased items.

The processor(s) 112 of the user device 104 can execute the view model module 142 of the application 120 to generate and update the view models 150. The view models 150 can include abstract and/or concrete data structures that hold information (e.g., an entirety of the information or a portion of the information) that the application 120 needs to display screens (user interfaces) and provide the functionality of the application 120. In some examples, the view models 150 are stored as a tree structure, where individual view model 150 corresponds to a user interface that is displayed by the application 120. For instance, the view models 150 can be linked together in the tree structure based on how the user 102 navigates through the different user interfaces of the application 120.

For example, if the application 120 corresponds to a TWITTER® application, a user interface may include a name of the user 102, a tweet posted by the user 102, and a date of the tweet. In such an example, a view model 150 of the user interface can include a list view and a cell layout of the user interface, the name of the user 102, the content of the tweet, and the date of the tweet. When the user 102 selects another user's profile using the application 120, thus causing the application 120 to display a new user interface associated with the another user's profile, a new view model is created that corresponds to the new user interface. For instance, the new view model may include a list view and a cell layout of the new user interface, a name of the another user, content of a tweet posted by the another user, and date of the tweet.

In some examples, the view models 150 are created using the services 148. For instance, the view model module 142 can use the information from the services 148 to create the view models 150. As such, when the information in the service 148 updates, such as by the user 102 providing input to interact with a function of the application 120, the view model module 142 can create a new view model 150 using the updated information. For example, if one of the view models 150 includes a cart view model corresponding to the cart service discussed above, each time the service module 140 adds a new item to the cart service, the view model module 142 renders a new cart view model that includes the new item.

The processor(s) 112 of the user device 104 can execute presentation module 144 of the application 120 to present the application 120 to the user 102. For instance, the presentation module 144 can generate user interfaces using the view models 150. To generate a user interface, the presentation module 144 uses information from one of the view models 150 to determine what features to include in the user interface. The presentation module 144 can then cause the user device 104 to display the user interface using the display 116. In some examples, the presentation module 144 can further update the user interface each time a new view model 150 is created.

For instance, the presentation module 144 can create a user interface that is associated with the item cart view model discussed above. To create the user interface, the presentation module 144 uses information from the item cart view model. For instance, the user interface can include each of the items that the user 102 has selected to purchase using the application 120. The user interface can further include buttons for selecting additional items and/or purchasing the selected items. In some examples, if the user 102 selects a new item to purchase using the user interface, the services module 140 updates the cart services to include the new item. Additionally, the view model module 142 renders a new cart view model that includes the new item added to the cart services, and the presentation module 144 presents a new user interface that reflects the updated cart view model.

The processor(s) 112 of the user device 104 can execute the view controller module 146 of the application 120 to detect when the user 102 interacts with the application 120, and to notify the services module 140 to update the services 148 based on the user interaction. For instance, if the user 102 adds a new item to the shopping cart discussed above, the view controller module 146 can detect the input of the user 102 adding the new item to the cart. The view controller module 146 can then notify the services module 140 to update the cart services to include the new item.

In the example of FIG. 1, while the application 120 is executing on the user device 104 (such as when presenting a user interface), an error may occur with the application 120 which prevents the application from operating correctly. For instance, the application 120 may include one or more bugs and/or defects that prevent the correct operation of the application 120. The one or more bugs and/or defects can cause the application 120 to crash. For instance, in some examples, the crash can occur when a program counter is set to an incorrect address and/or a buffer overflow overwrites a portion of an affected program code due to a bug. In some examples, the crash can cause the application to freeze or exit (e.g., close or shutdown).

Besides errors that cause the application 120 to crash, in some examples, the error may include other types of errors. For instance, the error can include any type error that can occur with an application 120 executing on the user device 104. For example, the error can include the application 120 being unable to connect to an input and/or output device, such as a printer or the network interface 118. In examples where the application 120 does not crash, the application 120 may display an error message that is associated with the error.

In response to the error, the application 120 may generate data corresponding to the error and cause the user device 104 to send the data to the service device(s) 108. The developer 106 associated with the service device(s) 108 can then use the data to debug the application 120. In some examples, the developer 106 can include a developer that created the application 120. For instance, the developer 106 may have written some and/or all of the code for the application 120. In some examples, the developer 106 can include another user that debugs applications, such as the application 120.

For instance, in response to the error, the application 120 may capture one or more stack traces 152. The stack traces 152 can include reports of active stack frames (i.e., machine dependent and Application Binary Interface dependent data structures containing subroutine state information) that were executing during a time of the error of the application 120. The application 120 can further capture a process image of the view model 150 that is being rendered at the time of the error. As discussed above, the view model 150 can include an abstract and/or concrete data structure that holds all of the information the application 120 uses to display the user interface to the user and provide the functionality of the application 120. As such, the process image of the view model 150 can include a state (i.e., current structure of the view model at the time of the error, including information and elements included in the view model and/or an error message that the application 120 displays that is associated with the error) of the view model 150 at a time of the error.

After capturing the process image of the view model 150, the user device 104 and/or the application 120 can serialize the process image of the view model 150. Serializing the process image of the view model 150 can include translating the process image of the view model 150 into a data format that the user device 104 can store and/or transmit via the network 110. For instance, the user device 104 and/or the application 120 can serialize the process image of the view model 150 in order to generate a serialized view model 124. The serialized view model 124 can include the data format that the user device 104 is configured to transmit via the network 110.

For example, serializing the process image of the view model 150 can include utilizing the serialization module 122 to translate the process image of the view model 150 into a serialized view model 124 that includes a JSON® format, a .NET FRAMEWORK®, a CFML® format, a PERL® format, a PYTHON® format, or the like. In such an example, the user device 104 can transmit serialized view model 124 in the data format via the network 110 to another electronic device.

In the example of FIG. 1, the user device 104 can then transmit stack traces 152 and/or serialized view model 124 to service device(s) 108. The service device(s) 108 may include server computers, personal computers, laptop computers, tablet devices, or any other devices. The service device(s) 108 shown in FIG. 1 is only one example of service device(s) 108 and are not intended to suggest any limitation as to the scope of use or functionality of any service device(s) 108 utilized to perform the processes and/or procedures described herein. For example, the service device(s) 108 may include various other applications or modules.

The processor(s) 126 of the service device(s) 108 may execute one or more modules and/or processes to cause the service device(s) 108 to perform a variety of functions, as set forth above and explained in further detail in the following disclosure. In some implementations, the processor(s) 126 may include a central processing unit (CPU), a graphics processing unit (GPU), both CPU and GPU, or other processing units or components known in the art. Additionally, each of the processor(s) 126 may possess its own local memory, which also may store program modules, program data, and/or one or more operating systems.

Depending on the exact configuration and type of the service device(s) 108, the computer-readable media 128 (discussed in more detail below) may include volatile memory (such as RAM), non-volatile memory (such as ROM, flash memory, miniature hard drive, memory card, or the like), or some combination thereof.

In some examples, the service device(s) 108 may also have input device(s) such as a keyboard, a mouse, a pen, a voice input device, a touch input device, etc. The service device(s) 108 may also include a display and other output device(s), such as speakers, a printer, etc. The developer 106 may utilize the foregoing features to interact with the service device(s) 108, or the user device 104 via the network(s) 110. For instance, the developer 106 may utilize the input device(s) to debug applications, such as application 120.

As illustrated in FIG. 1, computer-readable media 128 includes the application 120, payment module 132, user interaction module 134, deserialization module 136, and database 138. User interaction module 134 operates to interface with the user devices 104. For instance, the user interaction module 134 may operate in accordance with instructions from the payment module 132 to request or provide information on behalf of the payment module 132. The payment module 132 may handle the processing of payments. For example, the payment module 132 may utilize the user interaction module 134 to handle communications with the user 102.

For instance, if the application 120 includes an online shopping application, the payment module 132 can handle the processing of payments when the user 102 makes purchases through the application 120 and/or refunds purchases through the application 120. Additionally, the payment module 132 can handle the processing of payments when the user 102 first purchases the application 120 over the network 110 using the user device 104.

Deserialization module 136 operates to deserialize serialized view models 124 that service device(s) 108 receive from user device 104 and/or other user devices via network 110. For instance, processor(s) 126 of service device(s) 108 can execute deserialization module 136 to deserialize serialized view models 124. In some examples, deserializing serialized view models 124 can transform the serialized view models 124 into the format that the view models 150 were in before the serializing process. For instance, deserializing serialized view models 124 can generate view modules 150, which the developer 106 can use to debug the application 120.

For instance, the developer 106 can use the view models 150 and/or the stack traces 152 to debug the application 120. Debugging the application 120 can include finding and resolving bugs or defects that caused the error with the application 120 (e.g., bugs or defects that caused the application 120 to crash). The stack traces 152 can aid the developer 106 in debugging the application 120 by providing the developer 106 with information about what line of code failed and/or what input received from the user 102 caused the error. Additionally, the view models 150 can aid the developer 106 in debugging the application 120 by providing the developer 106 with information about the state of the application 120 at the time of the error. For instance, if the application 120 includes an online shopping application, the view models 150 can provide the developer 106 with information about what items the user 102 has selected and the order of the items within the cart.

Additionally, as illustrated in FIG. 1, the database 138 stores view models 150 and stack traces 152. In some examples, the service device(s) 108 may store both view models 150 and stack traces 152 in order to keep records of errors that have occurred with the application 120. By keeping records, the developer 106 and/or additional developers who debug the application 120 can determine whether the error is an ongoing error and/or a new error with the application 120. The developer 106 and/or the additional developers can then use that information when debugging the application 120.

It should be noted that, in some examples, the application 120 may capture process images of view models 150 at times other than at the time of the error. For example, application 120 may capture process images of view models 150 at set time intervals. For instance, the application 120 can capture process images of view models every minute, hour, day, or the like. For another example, application 120 may capture process images of view models 150 each time one of the view models 150 updates. For instance, each time the application 120 receives input from the user 102, the application 120 can update the services 148, render a new view model 150 using information from the updated services 148, and capture a process image of the new view model 150. In either example, the application can then serialize the view models 150 using the serialization module 122 and send the serialized view models 124 to the service device(s) 108. As such, the developer 106 associated with the service device(s) 108 can determine operations of the application 120 leading up to the error.

It should further be noted that, in some examples, the developer 106 may not be associated with the service device(s) 108. For instance, the developer 106 may be associated with an electronic device that is remote from both the user device 104 and the service device(s) 108. In such examples, the user device 104 and/or the service device(s) 108 can send the serialized view models 124 and/or the stack traces 152 to the remote electronic device associated with the developer 106.

Additionally, it should be noted that the serialized view models 124 can be used for purposes other than debugging an application. For example, the user device 104 can send serialized view models 124 (using the techniques above) to a device associated with a customer service representative. The customer service representative can then use the serialized view models 124 to reconstruct the display 116 of the user device 104 (by deserializing the serialized view models 124). By reconstructing the display 116 of the user device 104, the customer service representative can help troubleshoot the user device 104 using view models 150 that the user device 104 captures.

For another example, the user device 104 can send serialized view models 124 to a device associated with an employer of the user 102. The user device 104 can send the serialized view models 124 at given time intervals and/or each time the application 120 executing on the user device 104 updates. The employer can then deserialize the serialized view models 124 in order to reobtain the view models 150. Using the view models 150, the employer can then audit the user's 102 activities on the user device 104 by replaying every screen that was presented on the display 116 of the user device 102.

While the user device 104 and the service device(s) 108 are shown as including different modules, this is merely for ease of illustration and not intended as limiting. In various examples, the user device 104 and the service device(s) 108 may be identical, similar or distinct. Moreover, the modules shown and described for the user device 104 and the service device(s) 108 may be implemented as more modules or as fewer modules and functions described for the modules may be redistributed depending on the details of the implementation. Further, in some implementations, the user device 104 and/or the service device(s) 108 may vary from device to device. In general, the user device 104 and the service device(s) 108 can each be any appropriate device operable to send and receive requests, messages, or other types of information over the one or more networks 110 or directly to each other. Additionally, in some examples, there may be thousands, hundreds of thousands, or more, of the user devices 104 and the service device(s) 108.

In some examples, the network(s) 110 may be any type of network known in the art, such as a local area network or a wide area network, such as the Internet, and may include a wireless network, such as a cellular network, a local wireless network, such as Wi-Fi and/or close-range wireless communications, such as Bluetooth® and Bluetooth® low energy, near field communications (NFC), a wired network, or any other such network, or any combination thereof. Accordingly, the one or more networks 110 may include both wired and/or wireless communication technologies, including Bluetooth®, Bluetooth® low energy, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail. Consequently, the user device 104 and the service device(s) 108 may communicatively couple to the network(s) 110 in any manner, such as by a wired or wireless connection. The network(s) 110 may also facilitate communication between the user device and the service device(s) 108. In turn, the network interface 118 of the user device 104 and the network interface 130 of the service device(s) 108 may be any network interface hardware components that may allow the user device 104 and the service device(s) 108 to communicate over the network(s) 110.

Computer-readable media 114 and computer-readable media 128 may include computer storage media and/or communication media. Computer storage media can include volatile memory, nonvolatile memory, and/or other persistent and/or auxiliary computer storage media, removable and non-removable computer storage media implemented in any method or technology for storage of information such as computer-readable instructions, data structures, program modules, or other data. Computer-readable media 114 and computer-readable media 128 can be examples of computer storage media. Thus, the computer-readable media 114 and computer-readable media 128 includes tangible and/or physical forms of media included in a device and/or hardware component that is part of a device or external to a device, including but not limited to random access memory (RAM), static random-access memory (SRAM), dynamic random-access memory (DRAM), phase change memory (PRAM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer storage media, communication media may embody computer-readable instructions, data structures, program modules, or other data in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se.

Figure 2:
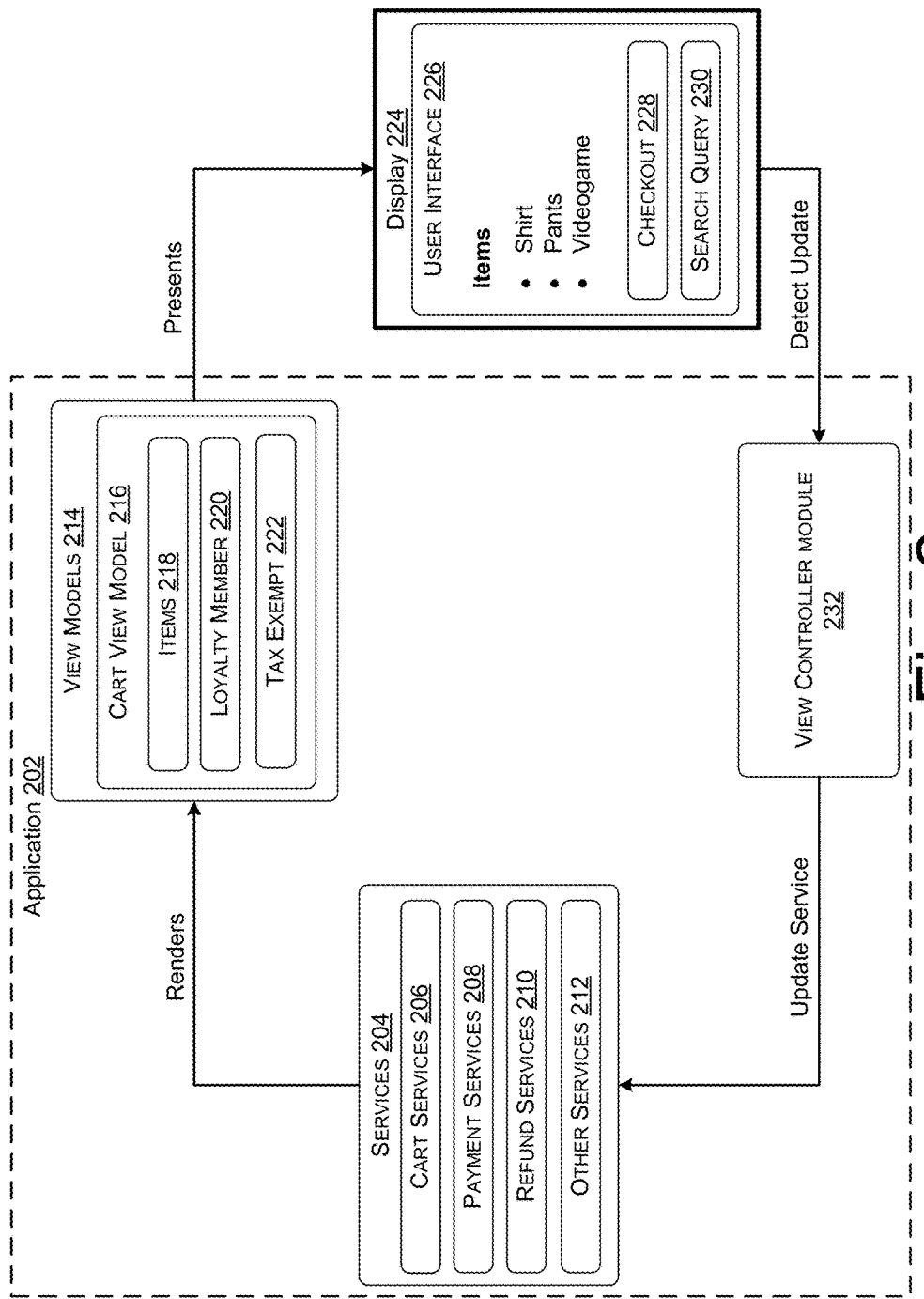
FIG. 2 is an example illustration of a mobile application rendering view models that a user device can use to send serialized view models to a service.

FIG. 2 is an example illustration of a mobile application rendering view models that a user device can use to send serialized view models to a service. In the example of FIG. 2, the application 202, which can represent the application 120 from FIG. 1, includes an online shopping application. However, the example of FIG. 2 is merely for illustrated purposes and is not intended to be limiting. For instance, in other examples, the application 202 can include a traveling application, videogame application, social networking application, or the like.

In the example of FIG. 2, the application 202 provides a user with different services 204, which can represent services 148 from FIG. 1. For instance, for the mobile shopping application 202 of FIG. 2, the services 204 include cart services 206, payment services 208, refund services 210, and other services 212. The cart services 206 includes code that provides the application 202 with functionality for creating an online shopping cart interface that a user can use to search for and select items for purchase. For instance, the user can search through items using the online shopping cart and select different items to purchase. The cart services 206 then stores information about the selected items and provides the user with the functionality to check the items out (e.g., purchase the items).

The payment services 208 includes code that provides the application 202 with functionality for creating a payment interface that a user can use to purchase selected items. For instance, the user can purchase the selected items using the payment interface. To purchase the selected items, the payment services 208 provides functionality for allowing the user to enter his or her personal and financial information into the payment interface. The payment services 208 then causes the device to interact with a service (such as service device(s) 108 from FIG. 1) in order to conduct a transaction for the selected items.

The refund services 210 includes code that provides the application 202 with functionality for creating a refund interface. A user of the application 202 can use the refund interface to return one or more items that were previously purchased by the user. To refund an item, the refund interface can include an area for inputting an identity of the item. The refund interface can further include an area for entering financial information, like a bank account number, so that the refund can be transferred to the user's bank account.

Other service 212 can include any other service that the application 202 provides to a user. For instance, in some examples, other services 212 can include a user account service that stores personal and/or financial information about the user. Other services 212 can further include a contact service that the user can use to send comments and/or questions about the application 202 to an entity that operates the application 202 (such as the service device(s) 108 from FIG. 1).

In the example of FIG. 2, the application 202 uses the services 204 to render view models 214, which can represent view models 150 from FIG. 1. As discussed above, a view model 214 includes abstract and/or concrete data structure that holds information (e.g., an entirety of the information or a portion of the information) the application 202 uses to display a user interface to the user and provide the functionality of the application 202. For instance, the application 202 can use the cart services 206 to render the cart view model 216. To render the cart view model 216, the application 202 uses information from the cart services 206. For instance, in the example of FIG. 2, the information can include items 218 selected by the user for purchase, whether the user is a loyalty member 220, and whether the user is tax exempt 222.

After rendering the cart view model 216, the application 202 can then cause a display 224, which can represent display 116 of FIG. 1, of a user device to present a user interface 226 that corresponds to the cart view model 216. As illustrated, the user interface 226 includes three items (i.e., shirt, pants, and videogame) selected by the user to purchase, where the three items correspond to items 218 of the cart view model 216. The user interface 226 further includes a checkout 228 button that the user can select when the user is ready to purchase the selected items. Additionally, the user interface 226 includes a search query 230 that the user can use to search for additional items if the user has not finished shopping using the online shopping application 202.

As illustrated in FIG. 2, view controller module 232, which can represent view controller module 146 from FIG. 1, detects when there is an update to the user interface 226 and sends the update to the services 204. For instance, a user of the user interface 226 may use the search query 230 to select an additional item to be added to the list of items. In response, the view controller module 232 can detect the input corresponding to the selection of the additional item. The view controller module 232 can then notify the services 204 that an additional item has been selected by the user so that the services 204 can update the cart service 206 to include the additional item. To update the cart service 206, the services 204 can update (e.g., add to) the cart services 206 with additional information that corresponds to the additional item.

In the example of FIG. 2, while updating the cart services 206, the application 202 may detect an error that causes the application 202 to operate incorrectly. For instance, the application 202 may crash in response to updating the cart services 206. In response, a user device (such as user device 104 from FIG. 1) and/or the application 202 can capture the last cart view model 216 (such as a process image of the last cart view model 216) that was rendered before the error. The user device and/or the application 202 can then serialize the last cart view model 216 (such as by using serialization module 122 from FIG. 1) and send the serialized cart view model 216 to a service (such as service device(s) 108 from FIG. 1).

In the example of FIG. 2, the last cart view model 216 includes a state of the cart view model 216 at the time of the error. For instance, the state of the cart view model 216 at the time of the error identifies that the cart view model 216 included items 218, loyalty member 220, and tax exempt 222 at the time of the error. A developer can then use the state (such as the items 218 included in the cart view model 216, whether the user is a loyalty member 220, and/or whether the user is tax exempt 222) to the debut the application 202 in order to fix the error.

It should be noted that, in the example of FIG. 2, the user device and/or the application 202 can further capture cart view models while the application 202 is functioning properly. For instance, the user device and/or the application 202 can capture cart view models at given time intervals, whenever the cart services 206 is updated and a new cart view model is rendered, based on user input, or the like. The user device and/or the application 202 can then serialize each of the cart view models after the capturing and send the serialized cart view models to the service.

Figure 3A:
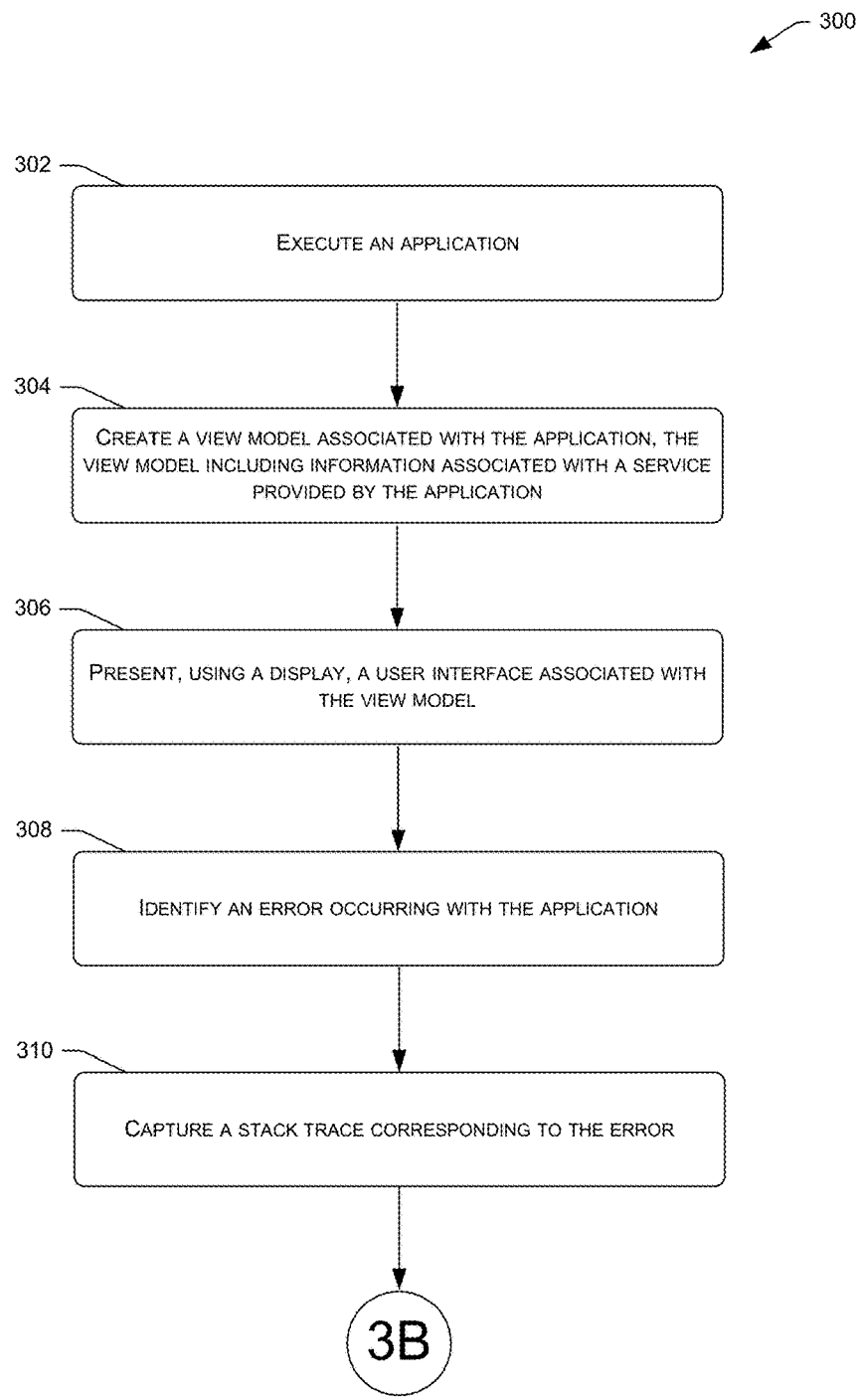
FIGS. 3A-3B illustrate a flow diagram of an example process for providing a serialized view model that is used to debug an application.
Figure 3B:
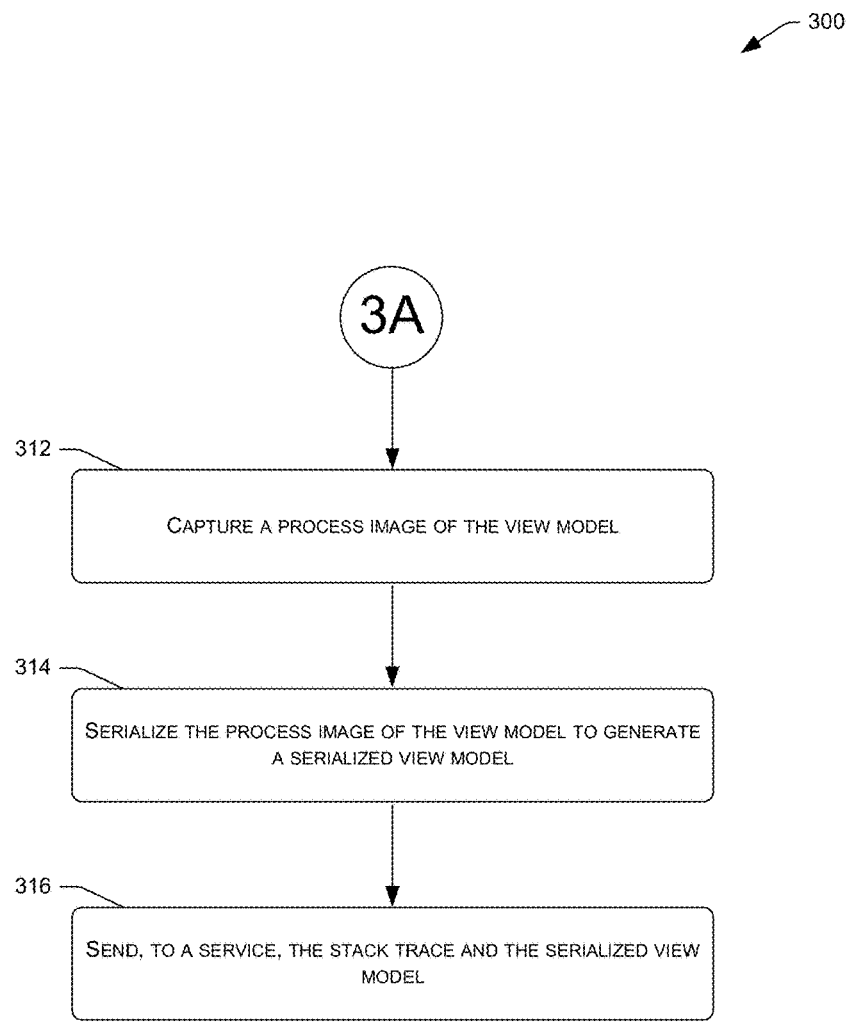

FIGS. 3A-3B illustrate a flow diagram of an example process for providing a serialized view model that is used to debug an application. The process 300 and other processes described herein are illustrated as collections of blocks in logical flow diagrams, which represent a sequence of operations, some or all of which can be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. For discussion purposes, the processes are described with reference to the environments, architectures and systems described in the examples herein, although the processes may be implemented in a wide variety of other environments, architectures and systems. The process 300, and other processes described herein, may be performed by a POS device, by a user device (e.g., device 104), by a remote service (e.g., service device(s) 108), by another entity, or by a combination thereof.

At 302, the process 300 executes an application. For instance, a user may download and install an application on a user device. The user device can then receive input for opening the application from the user. Based on the input, a processor of the user device can execute the application.

At 304, the process 300 creates a view model associated with the application, the view model including information associated with a service provided by the application. As discussed above, the view model can include an abstract and/or concrete data structure that holds information (e.g., an entirety of the information or a portion of the information) the application uses to display a user interface to a user and provide the functionality of the application. In some examples, creating the view model can include rendering the view model using the information from a service provided by the application. The information can represent a state of the service. For instance, the information can include data to include in the view model. For example, if the service includes a cart service for an online shopping application, the data can include one or more items selected by the user for purchase.

At 306, the process 300 presents, using a display, a user interface associated with the view model. For instance, the application can use data from the view model to generate a user interface. The application can then cause the device to present the user interface using a display of the user device. In some examples, the user interface can include an interactive user interface that receives input from the user in order to execute the functionality of the service.

At 308, the process 300 identifies an error occurring with the application. For instance, the application may include one or more bugs and/or defects that prevent the correct operation of the application. The one or more bugs or defects can cause the application to crash while the user device is executing the application (such as when the user device is presenting a user interface). In some examples, when the application crashes, the application may freeze. Additionally or alternatively, in some examples, the crash may cause the user device to exit the application.

At 310, the process 300 captures a stack trace corresponding to the error. For instance, the stack trace can include a report of active stack frames that were executing during a time of the crash of the application. As such, the stack trace can include data that identifies where in the code of the application the error (e.g., bug and/or defect) occurred.

At 312, the process 300 captures a process image of the view model and at 314, the process 300 serializes the process image of the view model to generate a serialized view model. For instance, at a time of the error, the user device and/or the application can capture a process image of the view model. As discussed above, the process image of the view model includes a state of the view model at the time of the error. The user device and/or the application can then process the process image of the view model using serialization in order to generate a serialized view model. As discussed above, the serialized view model can include a data format that the user device is configured to transmit via a network.

At 314, the process 300 sends, to a service, the stack trace and the serialized view model. For instance, the user device can send the stack trace and the serialized view model to a service device via a network. The service device can be associated with a developer and/or other entity that debugs the application when errors occur. As such, the developer and/or other entity can deserialize the serialized view model to reobtain the view model, and use the stack trace and the view model to debug the application. In some examples, the user device can then receive updates to the application from the service device that are based on the debugging.

Figure 4:
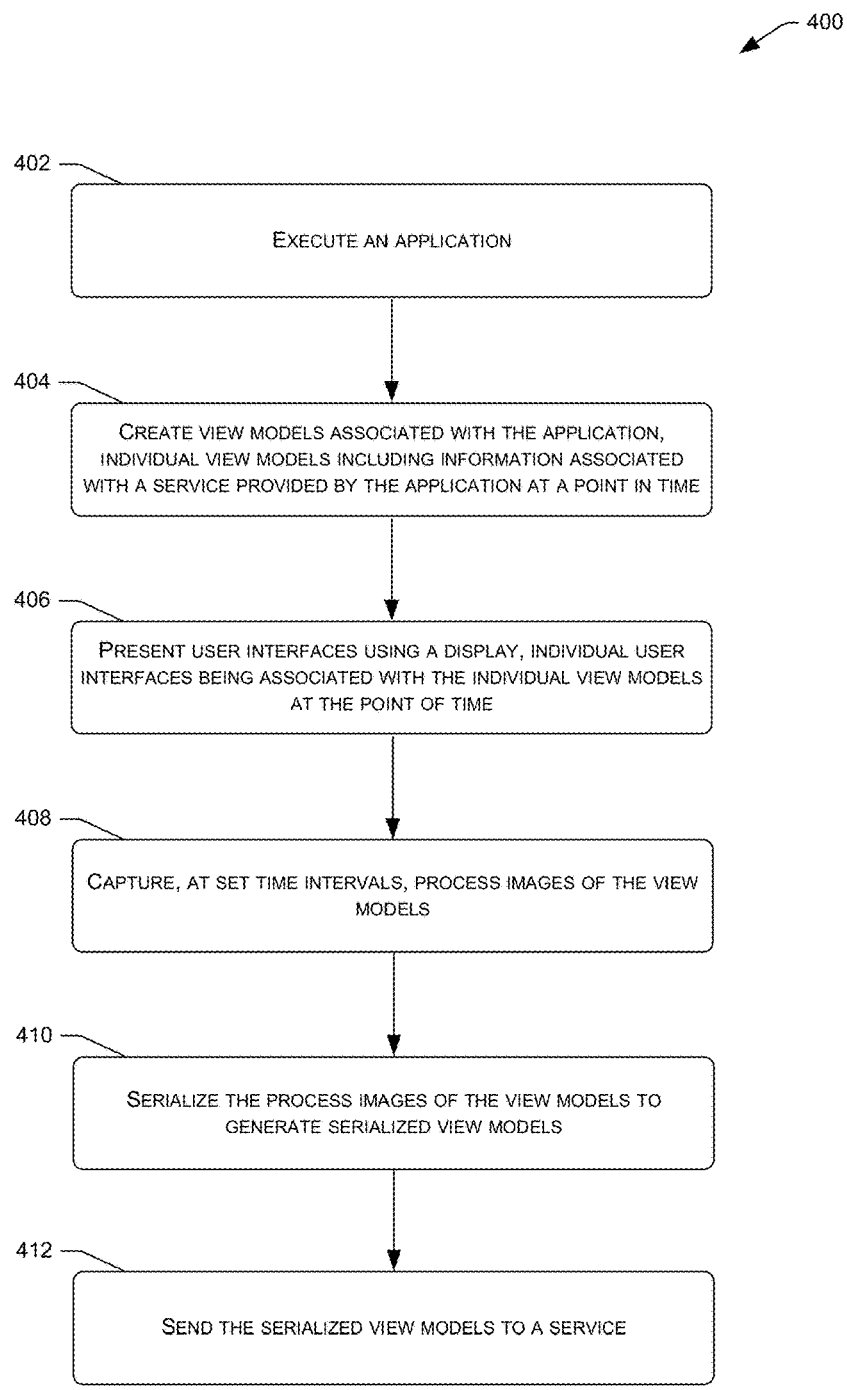
FIG. 4 illustrates a flow diagram of an example process for providing serialized view models to a service at set time intervals.

FIG. 4 illustrates a flow diagram of an example process for providing serialized view models to a service at set time intervals. At 402, the process 400 executes an application. For instance, a user may download and install an application on a user device. The user device can then receive input for opening the application from the user. Based on the input, a processor of the user device can execute the application.

At 404, the process 400 creates view models associated with the application, individual view models including information associated with a service provided by the application at a point of time. For instance, the application can render a view model using information from a service that the application provides. In some examples, the application can render a new view model each time the information from the service updates. For instance, the application can render a new view model each time the application receives input from the user and updates the service based on the input.

At 406, the process 400 can present user interfaces using a display, individual user interfaces being associated with the individual view models at the point of time. For instance, the application can present a new user interface associated with a new view model each time the view models are updated. The application can present the user interfaces using a display of the user device.

At 408, the process 400 captures, at set time intervals, process images of the view models. For instance, in some examples, the user device and/or the application can capture process images of the view models every second, minute, hour, or the like. Additionally or alternatively, in some examples, the user device and/or the application can capture process images of the view models using time intervals that vary based on one or more factors. The one or more factors can include how often the user device is executing the application, how much input the application receives from the user, how often the application updates, or the like.

At 410, the process 400 serializes the process images of the view models to generate serialized view models and at 412, the process 400 sends the serialized view models to a service. For instance, in some examples, each time a process image of a view model is captured, the user device and/or the application can serialize the process image of the view model to generate a serialized view model and send the serialized view model to a service, such as the service device(s) 108 from FIG. 1. Additionally or alternatively, in some examples, the user device and/or the application can save the process images of the view models and, based on the occurrence of an event, serialize the saved process images of the view models to generate serialized view models and send the serialized view models to the service. In some examples, the event can include the application receiving input from the user, an error occurring with the application, or the like.

Figure 5B:
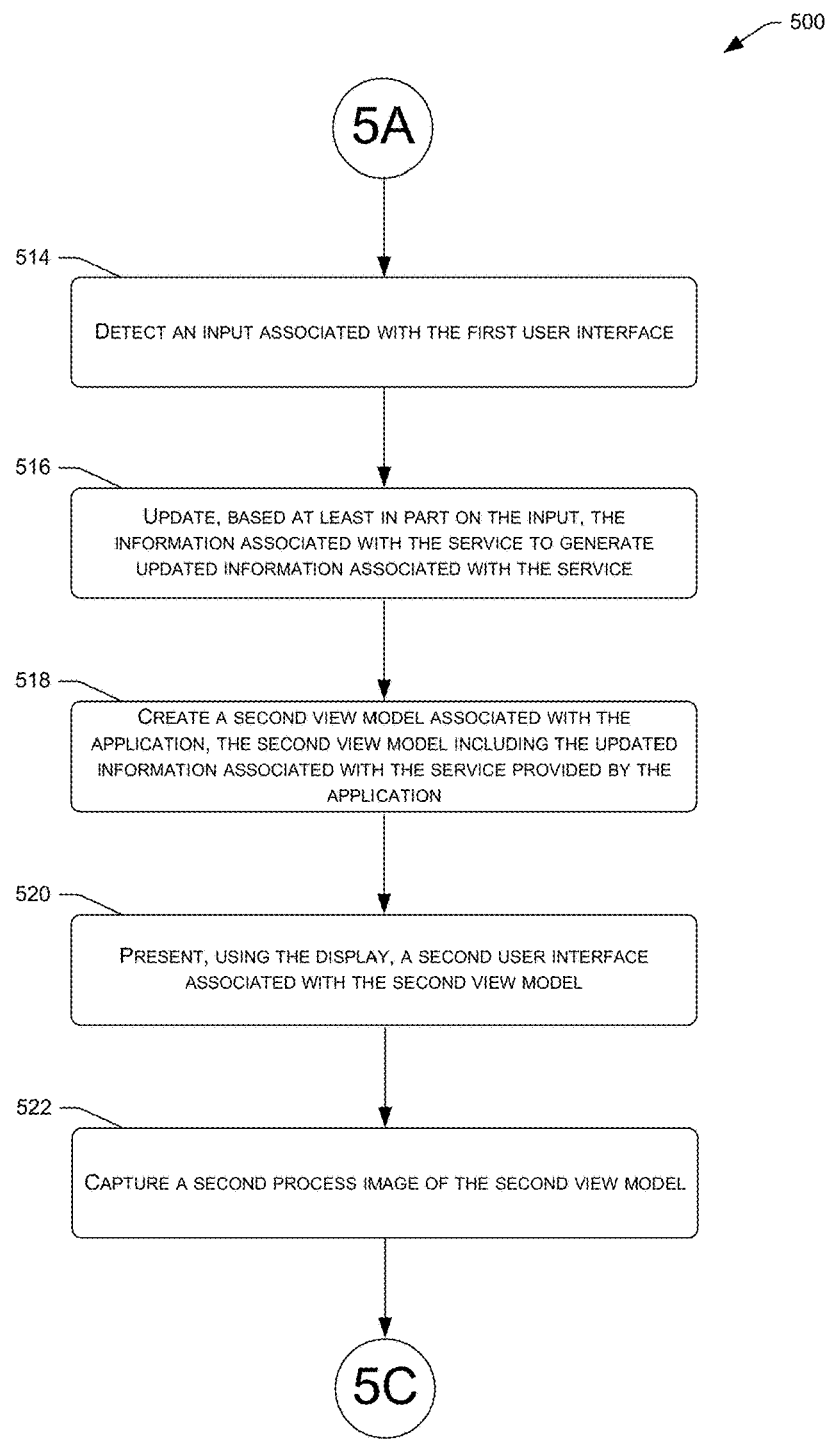
Figure 5C:
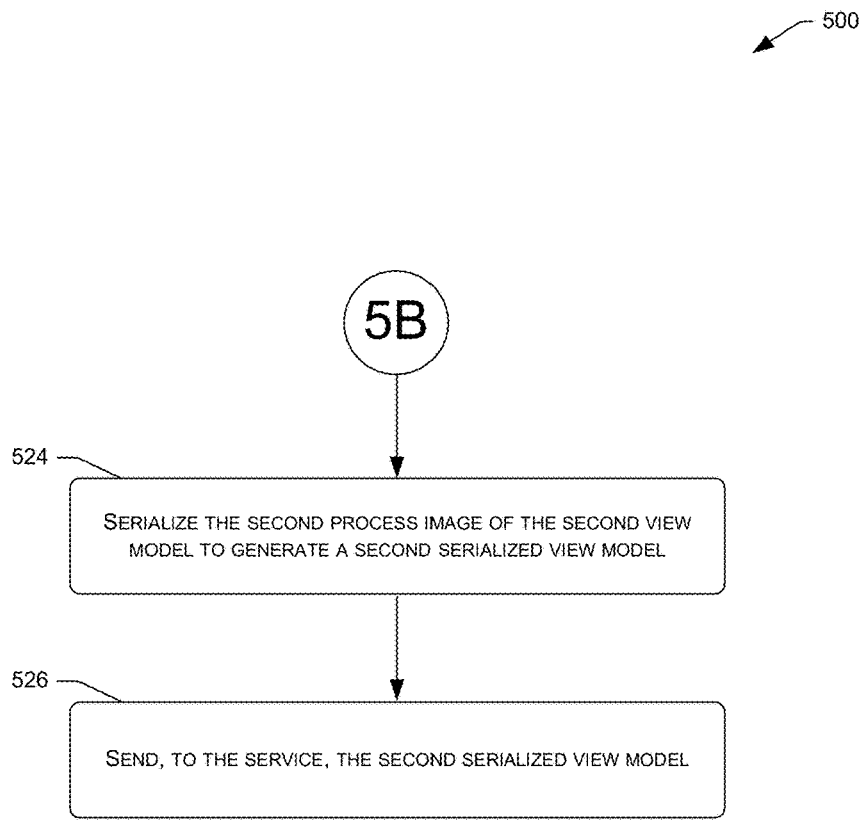

FIGS. 5A-5C illustrate a flow diagram of an example process for providing a serialized view model each time a service updates. At 502, the process 500 executes an application. For instance, a user may download and install an application on a user device. The user device can then receive input for opening the application from the user. Based on the input, a processor of the user device can execute the application.

At 504, the process 500 creates a first view model associated with the application, the first view model including information associated with a service provided by the application. For instance, the application can render the first view model using information from a service that the application provides. At 506, the process 500 presents, using a display, a first user interface associated with the first view model. For instance, the application can cause the user device to display a first user interface that the application presents based on the one or more elements.

At 508, the process 500 captures a first process image of the first view model and at 510, the process 500 serializes the first process image of the first view model to generate a first serialized view model. For instance, the user device and/or the application can capture a first process image of the first view model. As discussed above, a process image of a view model includes a state of the view model. The user device and/or the application can then process the first process image of the first view model using serialization in order to generate a first serialized view model.

At 512, the process 500 sends, to a service, the first serialized view model. For instance, the user device can send the first serialized view model to a service device via a network. The service device can be associated with a developer and/or other entity that debugs the application when errors occur. In some examples, the service device can deserialize, based on receiving, the first serialized view model in order to reobtain the first view model.

At 514, the process 500 detects an input associated with the first user interface and at 516, the process updates, based at least in part on the input, the information associated with the service to generate updated information associated with the service. For instance, the electronic device may receive input from the user. The input can include the user interacting with a function of the first user interface. Based on the input, the application can cause the service to update elements that represent (i.e., information associated with) the service. For instance, the application can update data that stores information associated with a state of the service. For example, if the service includes a cart service, the input can include adding another item to the cart and the update can include updating the information of the cart service to include the new item.

At 518, the process 500 creates a second view model associated with the application, the second view model including the updated information associated the service provided by the application. For instance, the application can render the second view model using updated information from the service that the application provides. At 520, the process 500 presents, using the display, a second user interface associated with the second view model. For instance, the application can cause the user device to display a second user interface that the application presents based on the one or more updated elements.

At 522, the process 500 captures a second process image of the second view model. For instance, in some examples, the user device and/or the application can capture the second process image of the second view model in response to the application rendering the second view model and/or presenting the second user interface. In some examples, the user device and/or the application can continue to capture view models each time a service is updated and a new view model is created based on the updating of the service.

At 524, the process 500 serializes the second process image of the second view model to generate a second serialized view model and at 526, the process 500 sends, to the service, the second serialized view model. For instance, the user device and/or the application can process the second process image of the second view model using serialization in order to generate a second serialized view model. The user device can send the second serialized view model to the service device via a network. In some examples, the service device can deserialize, based on receiving, the second serialized view model in order to reobtain the second view model.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A method comprising:
    creating, by an application executing on a first device, a first view model associated with the application, the first view model being in a first data format and including first data that, when rendered on a first display of the first device, depicts a first user interface, wherein the first data format is a tree structured data format;
    presenting, by the application and on the first display of the first device, the first user interface associated with the data of the first view model;
    receiving, via an input device of the first device, a first input to cause the application to perform a first action;
    creating, by the application executing on the first device, a second view model associated with the application, the second view model being in the first data format and including second data that, when rendered on the first display of the first device, depicts a second user interface, wherein one of the first view model and the second view model contain a link that allows a user to navigate to the other view model;
    presenting, by the application and on the first display of the first device, the second user interface associated with the second data of the second view model;
    storing the first view model and the second view model in memory of the first device;
    receiving, via the input device of the first device, a second input to cause the application to perform a second action;
    identifying, by the application, an error experienced by the application and caused by the second input;
    at least partially in response to identifying the error:
    capturing, by the application, a stack trace corresponding to the error, the stack trace including a report of active stack frames during a time of the error, the active stack frames including data structures that contain subroutine state information associated with the application;
    capturing, by the application, a process image of the first view model and the second view model including first data and second data that was rendered on the first display at the time of the error;
    serializing, by the application, the process image of the first view model and the second view model to generate a serialized view model, the serialized view model being in a second data format that is configured to be transmitted via a network;
    sending, by the application and to a service via the network, the stack trace and the serialized view model to enable the service to debug the application;
    deserializing, via a second device associated with the service, the serialized view model to obtain the first view model and the second view model in the first data format; and
    presenting the first user interface and the second user interface associated with the first view model and the second view model via a second display of the second device at least partially in response to deserializing the serialized view model at the second device.

2. A method as recited in claim 1, the method further comprises, before identifying the error occurring with the application:
    capturing, at periodic time intervals, process images of the first view model and the second view model;
    serializing the process images to generate additional serialized view models; and
    sending, to the service via the network, the additional serialized view models.

3. A method as recited in claim 1, wherein the identifying of the error associated with the application comprises identifying a crash of the application.

4. A method as recited in claim 1, wherein the receiving, via the input device of the first device, the input to cause the application to perform the action comprises receiving, via at least one of a keyboard, a mouse, a pen, a voice input device, or a touch input device, the input to cause the application to perform the action.

5. A method as recited in claim 1, wherein the application executing on the first device comprises a cart service configured to enable a purchase of an item, the method further comprising sending the serialized view model to a computing device associated with a customer service of the cart service, wherein the customer service is configured to identify the input that caused the cart service to fail.

6. A system comprising:
  a first application comprising first instructions that, when executed by one or more first processors of a first device, cause the one or more first processors to:
  create a view model associated with the first application, the view model comprising:
  a first individual view model including first information associated with a service provided by the first application, the first individual view model being in a first data format that comprises a tree structured data format and including first data that, when rendered on a first display of the first device, depicts a first user interface; and
  a second individual view model including second information associated with the service, the second individual view model being in the first data format and including second data that, when rendered on the first display, depicts a second user interface, wherein at least one of the first individual view model or the second individual view model contain a link that allows a user to navigate to the other view model;
  store the view model in memory of the first device;
  present, on the first display of the first device, the first user interface associated with the first data of the first individual view model, wherein the second user interface is not presented while the first user interface is being presented;
  identify an error experienced by the first application;
  capture a stack trace corresponding to the error;
  capture a process image of the first individual view model and the second individual view model;
  serialize the process image of the view model to generate a serialized view model, wherein serializing the process image of the view model includes translating the process image of the view model into a second data format that is configured to be transmitted via a network to the service; and
  send, to a second device via the network, the stack trace and the serialized view model; and
  the second device, comprising:
  one or more second processors; and
  a second application comprising second instructions that, when executed by one or more second processors of the second device, cause the one or more second processors to:
  receive the stack trace and the serialized view model;
  deserialize the serialized view model to obtain the view model in the first data format; and
  present the first user interface associated with the first individual view model in the first data format on a second display of the second device.

7. A system as recited in claim 6, wherein the first application further includes third instructions that, when executed by the one or more first processors of the first device, cause the one or more first processors to:
  capture, at periodic time intervals, process images of the first individual view model and the second individual view model;
  serialize the process images to generate additional serialized view models; and
  send, to the second device, the additional serialized view models.

8. A system as recited in claim 6, wherein the first application further includes third instructions that, when executed by the one or more first processors of the first device, cause the one or more first processors to:
  receive an input associated with a feature of the first user interface; and
  update, based at least in part on the input, the view model to generate an updated view model,
  wherein the capturing of the process image of the first individual view model and the second individual view model comprises capturing, based at least in part on the update, a process image of the updated view model.

9. A system as recited in claim 6, wherein capturing the stack trace and the process image of the first individual view model and the second individual view model includes:
  capturing the stack trace during a time of the error; and
  capturing the process image of the first individual view model and the second individual view model during the time of the error.

10. A system as recited in claim 9, wherein the process image of the first individual view model and the second individual view model includes a state of the first individual view model and the second individual view model at the time of the error.

11. A system as recited in claim 6, wherein the serialized view model includes the first individual view model and the second individual view model in the second data format.

12. A system as recited in claim 6, wherein the first application is configured to provide an item cart service, and wherein one or more elements of the item cart service include at least one item or service selected for purchase using the first application.

13. One or more computer storage media storing computer executable instructions that, when executed on one or more processors, cause the one or more processors to perform acts comprising:
  executing an application;
  creating, by the application, a view model associated with the application, the view model comprising:
  a first individual view model including first data that, when rendered on a display, depicts a first user interface in a first data format, wherein the first data format is a tree structured format; and
  a second individual view model including second data that, when rendered on the display, depicts a second user interface in the first data format, wherein at least one of the first individual view model or the second individual view model contain a link that allows a user to navigate to the other view model;
  storing the view model;
  presenting, by the application and on the display, the first user interface associated with the first data of the first individual view model, wherein the second user interface is not presented while the first user interface is being presented;
  identifying, by the application, an error experienced by the application;
  capturing, by the application, a stack trace corresponding to the error;
  capturing, by the application, a process image of the first individual view model and the second individual view model;
  serializing, by the application, the process image of the view model to generate a serialized view model, wherein generating the serialized view model comprises translating the process image of the view model into a second data format that is the configured to be transmitted via a network and to be deserializable by a deserialization module that is configured to convert the serialized view model to the view model, the deserialization module being associated with a computing service; and sending, by the application and to the computing service, the stack trace and the serialized view model.

14. One or more computer storage media as recited in claim 13, wherein before identifying the error occurring with the application, the instructions further program the one or more processors to:

capture, at periodic time intervals, process images of the first individual view model and the second individual view model;

serialize the process images to generate additional serialized view models; and send, to the computing service, the additional serialized view models.

15. One or more computer storage media as recited in claim 13, the instructions further program the one or more processors to:

receive an input associated with a feature of the first user interface; and receive, based at least in part on the input, the view model to generate an updated view model, and wherein the capturing of the process image of the first individual view model and the second individual view model comprises capturing, based at least in part on the update, a process image of the updated view model.

16. One or more computer storage media as recited in claim 13, wherein:

the capturing of the stack trace comprises capturing the stack trace during a time of the error; and the capturing of the process image of the first individual view model and the second individual view model comprises capturing the process image of the view model during the time of the error.

17. One or more computer storage media as recited in claim 13, wherein the process image of the first individual view model and the second individual view model includes a state of the view model at the time of the error.

18. One or more computer storage media as recited in claim 13, wherein the identifying of the error associated with the application comprises identifying a crash of the application.

19. One or more computer storage media as recited in claim 13, wherein the application is configured to provide a cart service, and wherein one or more elements of the cart service include at least one item or service selected for purchase using the application.

* * * * *